(12) United States Patent
Kwok et al.

(10) Patent No.: US 7,551,252 B2
(45) Date of Patent: Jun. 23, 2009

(54) BISTABLE TWISTED NEMATIC LIQUID CRYSTAL DISPLAY BASED ON DUAL FREQUENCY OPERATION

(75) Inventors: Hoi-Sing Kwok, Hong Kong (CN); Fion Sze Yan Yeung, Hong Kong (CN); Yuet Wing Li, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 262 days.

(21) Appl. No.: 11/604,072

(22) Filed: Nov. 24, 2006

(65) Prior Publication Data
US 2007/0139595 A1 Jun. 21, 2007

Related U.S. Application Data

(60) Provisional application No. 60/740,168, filed on Nov. 29, 2005.

(51) Int. Cl.
*G02F 1/1337* (2006.01)
(52) U.S. Cl. .................. 349/126; 349/179; 349/160
(58) Field of Classification Search ............. 349/33–55, 349/84–186
See application file for complete search history.

(56) References Cited

U.S. PATENT DOCUMENTS

| | | | |
|---|---|---|---|
| 4,239,345 A | 12/1980 | Berreman et al. | |
| 4,601,544 A | 7/1986 | Cheng et al. | |
| 5,594,464 A | 1/1997 | Tanaka et al. | |
| 5,796,459 A | 8/1998 | Bryan-Brown et al. | |
| 5,995,173 A | 11/1999 | Barberi et al. | |
| 6,038,001 A | 3/2000 | Ono et al. | |
| 6,133,975 A | 10/2000 | Li et al. | |
| 6,320,571 B1 | 11/2001 | Takahashi et al. | |
| 6,469,768 B1 | 10/2002 | Lee | |
| 6,573,971 B1 | 6/2003 | Yeung et al. | |
| 6,707,527 B1 | 3/2004 | Kwok et al. | |
| 6,784,955 B2 | 8/2004 | Kwok et al. | |
| 6,847,418 B2 | 1/2005 | Park | |
| 2003/0147033 A1* | 8/2003 | Stalder et al. | ............... 349/129 |

OTHER PUBLICATIONS

D.W. Berreman and W.R. Heffner; *New Bistable Liquid-Crystal Twist Cell*; J. Appl. Phys. 52 (4), (1981) 30032.

(Continued)

*Primary Examiner*—Frank G Font
*Assistant Examiner*—Michael P Mooney
(74) *Attorney, Agent, or Firm*—Robert D. Katz; Cooper & Dunham LLP (57) ABSTRACT

The invention provides a bistable twisted nematic liquid crystal display, comprising a first substrate having thereon a first conductive layer and a first alignment layer; a second substrate having thereon a second conductive layer and a second alignment layer; a liquid crystal layer in the first and second alignment layers; an alignment layer on each of the substrates, the alignment layer imparting a preferred direction for liquid crystal molecules near the alignment layer, and possessing different azimuthal and polar anchoring energies when used to align a liquid crystal layer: the alignment layers being rubbed in such a way to give a stable twist angle of the liquid crystal of ϕ where ϕ can be any value in between −45° to +45°; and wherein the d/p ratio of the liquid crystal layer is between the values of $0.15+0.5\phi/\pi$ and $0.35+0.5\phi/\pi$.

5 Claims, 6 Drawing Sheets

OTHER PUBLICATIONS

D.W. Berreman; *Optics In Smoothly Varying Anisotropic Planar Structure: Application To Liquid-Crystal Twist Cell*; J. Opt. Soc. Am. 63 (11), (1973) 1374.

H.S. Kwok; *Parameter Space Representation of Liquid Crystal Display Operating Modes*; J. Appl. Phys. 80 (7), (1996) 3687.

T.Z. Qian et al.; *Dynamic Flow and Switching Bistability in Twisted Nematic Liquid Crystal Cells*; Appl. Phys. Lett. 71 (5), (1997) 596.

Z. L. Xie and H.S. Kwok; *Reflective Bistable Twisted Nematic Liquid Crystal Display*; Jpn. J. Appl. Phys. 37 (1998) 2572.

Z.L. Xie and H.S. Kwok; *New Bistable Twisted Nematic Liquid Cystal Displays*; J. Appl. Phys. 84 (1), (1998) 77.

I. Dozov et al.; *Fast Bistable Nematic Display Using Monostable Surface Switching*; Appl. Phys. Lett. 70 (9), (1997).

* cited by examiner

BISTABLE TWISTED NEMATIC LIQUID CRYSTAL DISPLAY BASED ON DUAL FREQUENCY OPERATION

CROSS-REFERENCE TO RELATED APPLICATIONS

This application claims the benefit of U.S. Provisional Patent Application No. 60/740,168, filed Nov. 29, 2005, the entire content of which is incorporated herein by reference.

FIELD OF INVENTION

The present invention relates to liquid crystal display (LCD) technologies, and more particularly to a bistable twisted nematic LCD, which is based on dual frequency operation in the driving electronics.

BACKGROUND OF THE INVENTION

Liquid crystal displays (LCD) that are bistable under zero voltage bias conditions are desirable for many applications. There are many LCD configurations that are bistable and possess two stable states under no voltage conditions. Examples include: (1) bistable cholesteric LCD; (2) bistable ferroelectric LCD; (3) bistable twisted nematic LCD where the two stable twist states differ by 360 degrees in twist angle; (4) bistable twisted nematic LCD where the two stable twist states differ by 180 degrees in twist angle; and (5) zenithal bistable display, which is based also on nematic liquid crystals. Each of these bistable displays has its own merits and shortcomings.

The present invention is related to the two types of bistable twisted nematic LCD displays listed above. Both classes of bistable liquid crystal displays are based on the twisted nematic effect in a liquid crystal display. They are based on the interplay between the elasticity of the liquid crystal and the surface anchoring conditions. The 360 degree bistable nematic LCD have bistable states for both twist states. In the $2\pi$ bistable twisted nematic liquid crystal display, the bistable twist states are zero twist and 360° twist states (see, D. W. Berreman and W. R. Heffner: *J. Appl. Phys.* 52 (1981) 3032; and D. W. Berreman: *J. Opt. Soc. Am.* 63 (1973) 1374.). Kwok teaches a generalization of such bistable twisted nematic displays where the bistable twist states are $\phi$ and $\phi+2\pi$ twist states where $\phi$ can be several fixed values, both negative and positive (see, H. S. Kwok: *J. Appl. Phys.* 80 (1996) 3687, T. Z. Qian, Z. L. Xie, H. S. Kwok and P. Sheng: *Appl. Phys. Lett.* 71 (1997) 596, Z. L. Xie and H. S. Kwok: *Jpn. J. Appl. Phys.* 37 (1998) 2572, and Z. L. Xie and H. S. Kwok: *J. Appl. Phys.* 84 (1998) 77). These $\phi$ values have been calculated and experimentally verified. These bistable twisted nematic displays can be called $2\pi$-BTN displays.

Durand teaches another variant of the $2\pi$-BTN bistable twisted nematic display where the bistable twist states are zero and 180° twist states (See, I. Dozov, M. Nobili and G. Durand: *Appl. Phys. Lett.* 70 (1997) 1179.). The switching of such a display is more difficult (but not impossible), than the $2\pi$-BTN bistable liquid crystal displays. Strong asymmetric anchoring and thin cell gaps have to be used. Again, Kwok teaches a generalization of such bistable twisted nematic displays where the bistable twist states are $\phi$ and $\phi+\pi$ twist states, and where $\phi$ can be one of several published values (See H. S. Kwok: *J. Appl. Phys.* 80 (1996) 3687, T. Z. Qian, Z. L. Xie, H. S. Kwok and P. Sheng: *Appl. Phys. Lett.* 71 (1997) 596, Z. L. Xie and H. S. Kwok: Jpn. *J. Appl. Phys.* 37 (1998) 2572, and Z. L. Xie and H. S. Kwok: *J. Appl. Phys.* 84 (1998) 77.). Thus, another name for this class of bistable twisted nematic LCD is $\pi$-BTN bistable liquid crystal displays.

This invention relates to a method of construction and a driving scheme for the $\pi$-BTN bistable twisted nematic LCD. In this invention, a special combination of alignment layers and liquid crystals guarantees that bistability is achieved readily and that the driving scheme enables this bistable display to be switched easily. In particular, the cell gap can be much larger than the 2 μm required for the Dozov $\pi$-BTN. As well, the driving scheme is much simpler.

SUMMARY OF INVENTION

In accordance with the objects of the present invention, there is provided in one embodiment of the present invention aspect a bistable liquid crystal device having a first substrate having thereon a first conductive layer and a first alignment layer; a second substrate having thereon a second conductive layer and a second alignment layer; and a liquid crystal layer sandwiched between the first and second alignment layers. The first alignment layer induces a pretilt angle $\theta_1$ between the liquid crystal layer in contact with the first alignment layer. The second alignment layer induces a second pretilt angle $\theta_2$ between the liquid crystal layer in contact with the second alignment layer. The values of $\theta_1$ and $\theta_2$ can be any value. The liquid crystal layer is capable of maintaining a twist state of $\phi$ degrees. The d/p ratio of the liquid crystal layer is such that the elastic deformation energies of the $\phi$ and $\phi+\pi$ twist states are more or less the same. Thus, they are equally stable under no voltage bias conditions.

Figure 5:
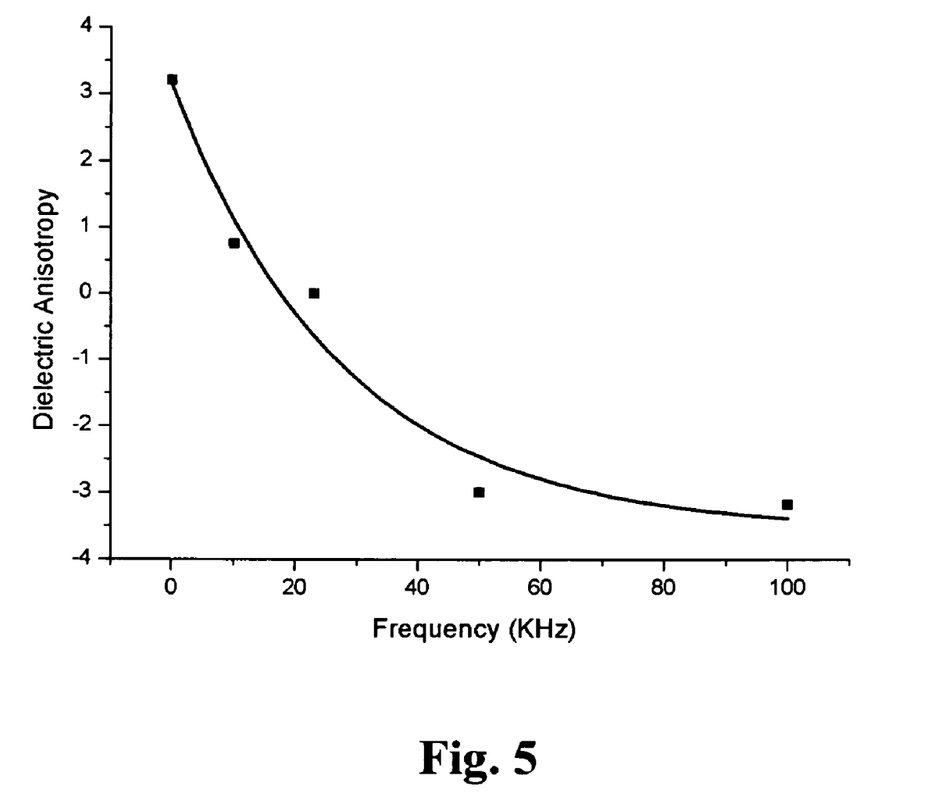
FIG. 5 shows the behavior of the dielectric anisotropy as a function of the driving frequency of the electrical pulse.

In another preferred embodiment, the liquid crystal layer is of the dual frequency type. It has a positive dielectric anisotropy when the driving voltage is a low frequency AC signal of sinusoidal or pulsed type. It has a negative dielectric anisotropy when the driving voltage is a high frequency AC signal of sinusoidal or pulsed type. The crossover frequency of this dual frequency liquid crystal can be any value between 50 kHz to 500 kHz. The dependence of the dielectric anisotropy $\Delta\epsilon$ on the operating frequency $\nu$ is shown in FIG. 5. Actually, most liquid crystal materials exhibit this behavior, except that the effect and the crossover frequency may not be at the desired values. It is well known that liquid crystals having positive $\Delta\epsilon$ will align themselves along the direction of the electric field, i.e. perpendicular to the liquid crystal cell. For a liquid crystal with negative $\Delta\epsilon$, they will align themselves perpendicular to the direction of the electric field due to the dielectric force. The general expression of the dielectric anisotropy is given by $$\Delta\varepsilon = -\varepsilon_1 + \frac{\varepsilon_2}{1+\omega^2\tau^2}$$

where $\epsilon_1$, $\epsilon_2$, and $\tau$ are parameters with positive values, and $\omega=2\pi\nu$. $\epsilon_2>\epsilon_1$ so that at low frequency $\Delta\epsilon$ is positive and at high frequency $\Delta\epsilon$ is negative. Thus, the use of asymmetric anchoring and dual frequency liquid crystals are important advantages of the present invention.

BRIEF DESCRIPTION OF THE DRAWINGS

Further features and advantages of the invention may be understood by reference to the following detailed description of the preferred embodiments taken in conjunction with the attached drawings in which.

DETAILED DESCRIPTION OF PREFERRED EMBODIMENTS

Figure 1:
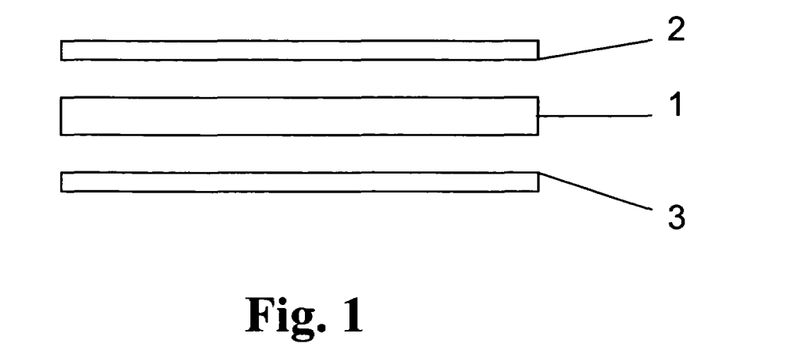
FIG. 1 is a diagram showing the sectional view of a portion of an LCD device of the present invention.
Figure 2:
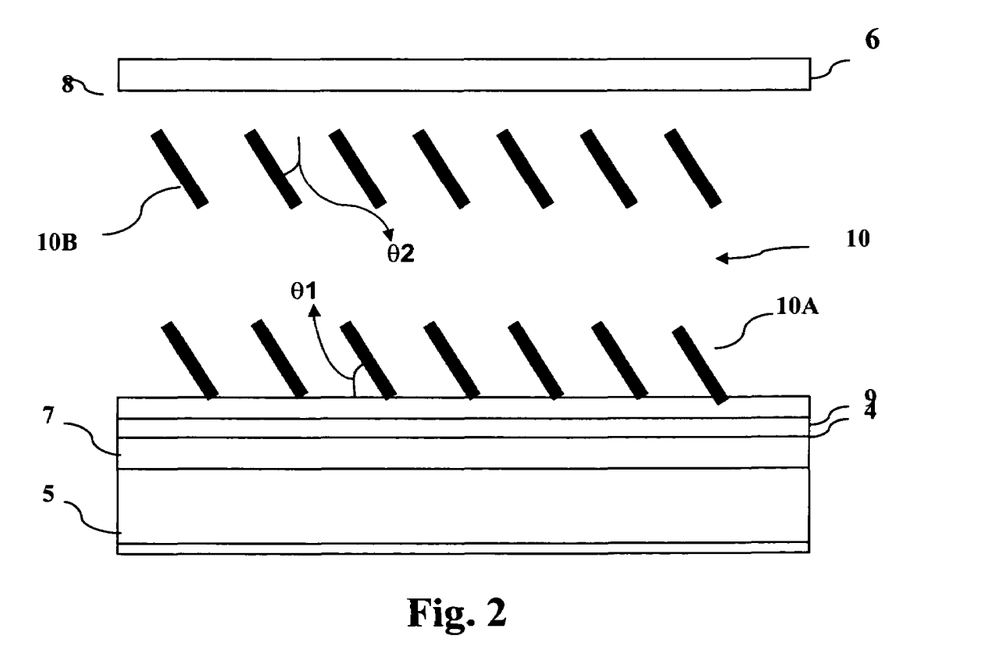
FIG. 2 is another diagram showing the sectional view of a portion of an LCD device.
Figure 3:
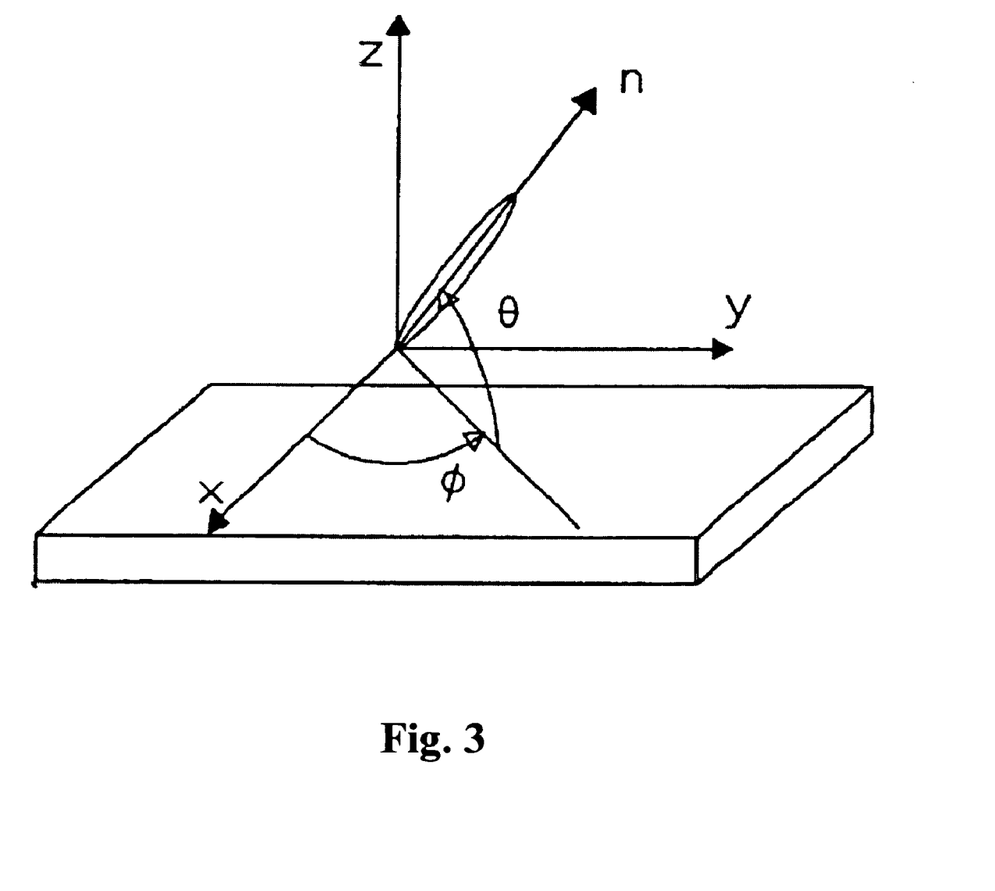
FIG. 3 another diagram showing the sectional view of a portion of a LCD device.

A passive matrix liquid crystal display is composed of a liquid crystal layer 3 held between two pieces of glass 1 and 2. On these glasses, there can be conductive transparent electrodes, alignment layers and other coatings necessary for making the display. For a transmissive display, a front polarizer 4 and a rear polarizer 5 are used as shown in FIG. 1. For the case of a transflective display, a diffusive reflector 6 can also be added as shown in FIG. 2. In the case of a single polarizer reflective display, the rear polarizer 5 is eliminated as shown in FIG. 3. A special reflector 7 which does not produce any depolarization effect will then have to be used.

Figure 4:
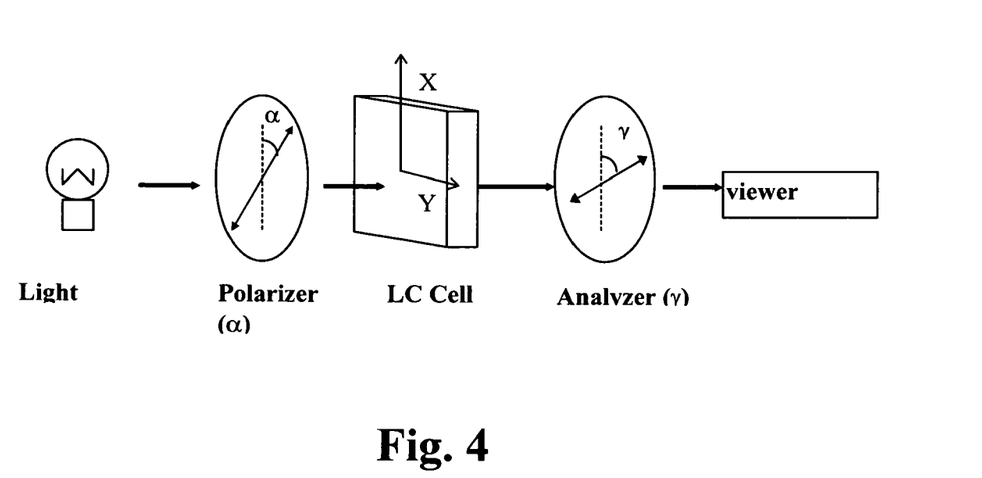
FIG. 4 shows the various angles of the liquid crystal cell.

The transmission or reflection properties of an LCD are completely characterized by its input polarizer angle α, the cell gap d-birefringence Δn product, Δn, the twist angle of the liquid crystal φ, and the output polarizer angle γ. All of these angles are measured relative to the input director of the LCD cell which is defined as the x-axis. The various directions inside an LC cell are shown in FIG. 4. The twist angle φ is the angle between the input and output directors. The input and output polarizers are at angles relative to the input director.

Thus, it is the purpose of the present invention to disclose a bistable liquid crystal cell that switches between the low and high twist states using the alignment properties of the dual frequency liquid crystal. To optimize the optical properties of this liquid crystal cell, the values of input polarizer angle α, the cell gap d-birefringence Δn product, dΔn, the twist angle of the liquid crystal φ, and the output polarizer angle γ have to be given according to specified values. These values of the liquid crystal layer are given in the literature and are known in the art. For example, those given by H. S. Kwok et al in U.S. Pat. No. 6,784,955 B2 (2004), H. S. Kwok: *J. Appl. Phys.* 80 (1996) 3687, T. Z. Qian, Z. L. Xie, H. S. Kwok and P. Sheng: *Appl. Phys. Lett.* 71 (1997) 596, Z. L. Xie and H. S. Kwok: *Jpn. J. Appl. Phys.* 37 (1998) 2572, and Z. L. Xie and H. S. Kwok: *J. Appl. Phys.* 84 (1998) 77.

One of the provisions of the present invention is the asymmetric anchoring energies afforded by the first and second alignment layers. Asymmetric anchoring is an important feature and has to be carefully designed in order for the bistable twisted nematic liquid crystal display to work properly. These alignment layers can be either conventional rubbed polyimides or special alignment surfaces which is part of the present invention. These special alignment layers have controllable anchoring energies and are based on mixtures of polyimides and other polymers that are not used ordinarily for alignment of liquid crystals.

In the first preferred embodiment of the present invention, the bistable liquid crystal display is made of two glass substrates 1 and 2 with a liquid crystal layer 3 between them. On the glass substrates, there are layers of transparent conductive films 8 and 9. An example of such transparent conductive material is indium tin oxide (ITO). These layers can be patterned into stripes in a typical passive matrix arrangement. On one glass substrate, the stripes are horizontal and on the other substrate the stripes are in the perpendicular direction. Overlap of the stripes form the pixel area.

The ITO is coated with alignment layers 10 and 11. These alignment layers are used to align the liquid crystal molecules in the liquid crystal layer 3. The most important parameter for the liquid crystal layer is the pretilt angle at the boundary with the alignment layer. These pretilt angles $\theta_1$ and $\theta_2$ determine the values of $\theta(z)$ and $\phi(z)$ throughout the liquid crystal cell (see FIG. 3) of the liquid crystal layer 3 when no voltage is applied.

This liquid crystal layer 3 has a liquid crystal director with orientations θ and φ, which are the azimuthal and polar angles respectively as shown in FIG. 3. The alignment of the director, i.e. the values of $\theta(z)$ and $\phi(z)$ determine the optical properties of the liquid crystal cell. It determines basically the transmittance or reflectance of the liquid crystal cell. As shown in FIG. 3, the director of liquid crystal molecule n is determined by a pretilt angle (tilt angle) θ which corresponds to a polar angle of the director n and a pretilt angle direction (twist angle) φ which corresponds its azimuthal angle. The Cartesian coordinate of the director n of liquid crystal molecule is defined as:

$$n = (\cos\theta\cos\phi, \cos\phi\sin\theta, \sin\theta).$$

The director n of the liquid crystal is determined by controlling the pretilt angle θ and the pretilt angle direction φ by carrying out alignment process on the substrate.

The transmission or reflectance of light by the liquid crystal cell is determined by the angle of the polarizer α and the angle of the analyzer γ as shown in FIG. 4, and the alignment condition of the liquid crystal layer 3. The electrodes 6, 7 and the alignment layers 8, 9 are used to control the alignment conditions of the liquid crystal layer 10. The electrodes provide the voltage to control the values of $\theta(z)$ and $\phi(z)$. The alignment layers and their treatment determine the values of $\theta(0)$ and $\phi(0)$. The values of $\theta(0)$ and $\phi(0)$, together with the elastic Euler's equation, determine the solution of $\theta(z)$ and $\phi(z)$. The physics of the alignment of the liquid crystal layer is well-known in the art and is well covered in the literature, such as given in the monograph "Electrooptic Effects in Liquid Crystal Materials" written by Blinov and Chigrinov, published by Springer in 1994, which is incorporated herein by reference, as are all other cited references, patents, and published or other patent applications cited herein. $\theta(0)$ and $\phi(0)$ are known as the easy axes for liquid crystal alignment. Since there are two surfaces to the liquid crystal layer, both $\theta(0)$, $\phi(0)$ and $\theta(d)$, $\phi(d)$ are needed to completely determine $\theta(z)$ and $\phi(z)$. Here d stands for the other surface at z=d. The invention disclosed here can be applied to control either $\theta(0)$, $\phi(0)$ or $\theta(d)$, $\phi(d)$ or to both sets of values. For the purpose of discussion, we shall only refer to the z=0 surface in the rest of this disclosure.

Essentially, in the continuum theory, the director orientation $\theta(z)$ and $\phi(z)$ is determined by minimization of the elastic energy, known as the Frank-Oseen elastic energy equation given by:

$$F = \frac{1}{2}K_{11}(\nabla \cdot n)^2 + \frac{1}{2}K_{22}(n \cdot \nabla \times n - q_0)^2 + \frac{1}{2}K_{33}|n \times \nabla \times n|^2$$

where $K_{ii}$ are the elastic constants and $q_0$ is the intrinsic twist of the liquid crystal layer. The minimization leads to the Euler-Lagrange equations subjected to the various boundary conditions $\theta(0)$, $\phi(0)$ and $\theta(d)$, $\phi(d)$.

It should be noted that the actual alignment directions of the liquid crystal on the surfaces is also dependent on the polar anchoring energies $W_{\theta 1}$ and $W_{\theta 2}$, and the azimuthal anchoring energies $W_{\phi 1}$ and $W_{\phi 2}$ of the two alignment surfaces 10, 11 respectively. The anchoring energy is a measure of how strong the anchoring condition is. If the anchoring energy is large, then it is difficult to deviate from this condition and the alignment angles are given by the easy axes directions. For weak anchoring, the actual angles of the liquid crystals on the surface may deviate from $\theta(0)$ and $\phi(0)$. Again, well-known formulas are available to calculate the alignment of the liquid crystal molecules for all values of z given the anchoring energies.

The values of $\theta(0)$ and $\phi(0)$ or the alignment of the liquid crystal molecules right near the alignment layer are important in designing the electro optical properties of the liquid crystal cell and is the subject of the present invention. The alignment of the liquid crystal molecules can be achieved by many means and is a well studied problem in liquid crystal physics and engineering. The predetermined alignment conditions are usually achieved, for example, by rubbing the alignment layers 10, 11.

In the present embodiment of this invention, the anchoring energies on the two surfaces are different. On one surface the anchoring is strong while on the other surface the anchoring is weaker. Surface anchoring breaking is an important part of the operation of the bistable twisted nematic display in the present invention. We thus require that the alignment layers on the two sides of the liquid crystal cell be made with different materials, preferably polyimide alignment materials. The difference in anchoring energy should be at least a factor of two different. For example, one side may have a polar anchoring energy of $1.2\times10^{-3}$ J/m$^2$, while the other may have an anchoring energy of $2.4\times10^{-3}$ J/m$^2$.

There are several methods of obtaining such asymmetric anchoring for the liquid crystal cell. In one embodiment of the present invention, the alignment layers are made of polyimides. Polyimide is well known in its ability to align liquid crystal molecules by mechanical rubbing. A rubbed polyimide layer can induce an alignment direction and a pretilt angle in the order of 0-5 degrees. The anchoring energy of the polyimide is determined by the chemistry of the polyimide material. Thus it is possible to select different polyimides for the two surfaces of the liquid crystal cell so that there is asymmetric anchoring. The asymmetric anchoring condition can be achieved by rubbing of polyimide alignment layers on the two sides of the LC cell with different anchoring strengths. There are many commercial polyimides that provide different values of polar and azimuthal anchoring energies. In this embodiment, the dual frequency liquid crystal can be used in conjunction with such polyimides to provide the bistable display.

In another embodiment of the present invention, the asymmetric anchoring can be obtained by rubbing of a polyimide/polymer mixture. The preparation of the alignment layer consists of the following steps: (1) Prepare a liquid mixture of polyimides and a polymer in a solvent. Examples of this include a mixture of polyvinylpyrrolidone (PVP) and polyimide JALS-9203-R2 provided by JSR, (2) Coat the mixture onto the substrate of the liquid crystal cell. There are many coating methods that can be used. For example, it is possible to use spin coating, dip coating, printing, spraying, and doctor blade coating etc. (3) Rapid drying of the liquid coating. This rapid drying can be part of the coating method, but it is also possible to separate the coating and drying steps as in thermal drying on a hot plate. (4) Curing of the polymer/polyimide layer by thermal or ultraviolet light. (5) Rubbing of the polyimide/polymer layer to obtain alignment in a particular direction. This step is similar to conventional polyimide alignment layer. Due to the weak or zero anchoring of the polymer layer, the final mixed polymer/polyimide layer will have weak anchoring energy. By controlling the ratio of the polymer to the polyimide in this composite alignment layer, one can control the anchoring energy of this layer. Thus one can obtain asymmetric anchoring of the liquid crystal cell.

The rubbing directions of the top and bottom alignment layers determine the twist angle of the liquid crystal layer. The twist angle and retardation of the liquid crystal cell are given by prior art, for example, by H. S. Kwok et al in U.S. Pat. No. 6,784,955 B2 (2004), H. S. Kwok: *J. Appl. Phys.* 80 (1996) 3687, T. Z. Qian, Z. L. Xie, H. S. Kwok and P. Sheng: *Appl. Phys. Lett.* 71 (1997) 596, Z. L. Xie and H. S. Kwok: *Jpn. J. Appl. Phys.* 37 (1998) 2572, and Z. L. Xie and H. S. Kwok: *J. Appl. Phys.* 84 (1998) 77. Specifically one of such values can be give by those listed in Table I. The d/p ratio is used to control the bistability of the liquid crystal layer. d/p has to be within the range of 0.2-0.4 in order for bistability to occur for the π-BTN display.

TABLE I

| Parameter | Value | Units |
| --- | --- | --- |
| Twist angle | 22.5°, 202.5° | Degrees |
| Polarizer angle | 45° | Degrees |
| Analyzer angle | 67.5° | Degrees |
| Cell gap - birefringence product | 0.546 | μm |
| d/p ratio | 0.5625 | |

The liquid crystal used has to be a dual frequency liquid crystal, such as Merck MLC-2048. Dual frequency liquid crystals are characterized by a cross over frequency $v_c$. For electrical driving frequency below 23.5 kHz, dielectric anisotropy is positive. For a driving frequency above 23.5 kHz, the value of dielectric anisotropy becomes negative. FIG. 5 shows the specific example for Merck MLC-2048.

Figure 6:
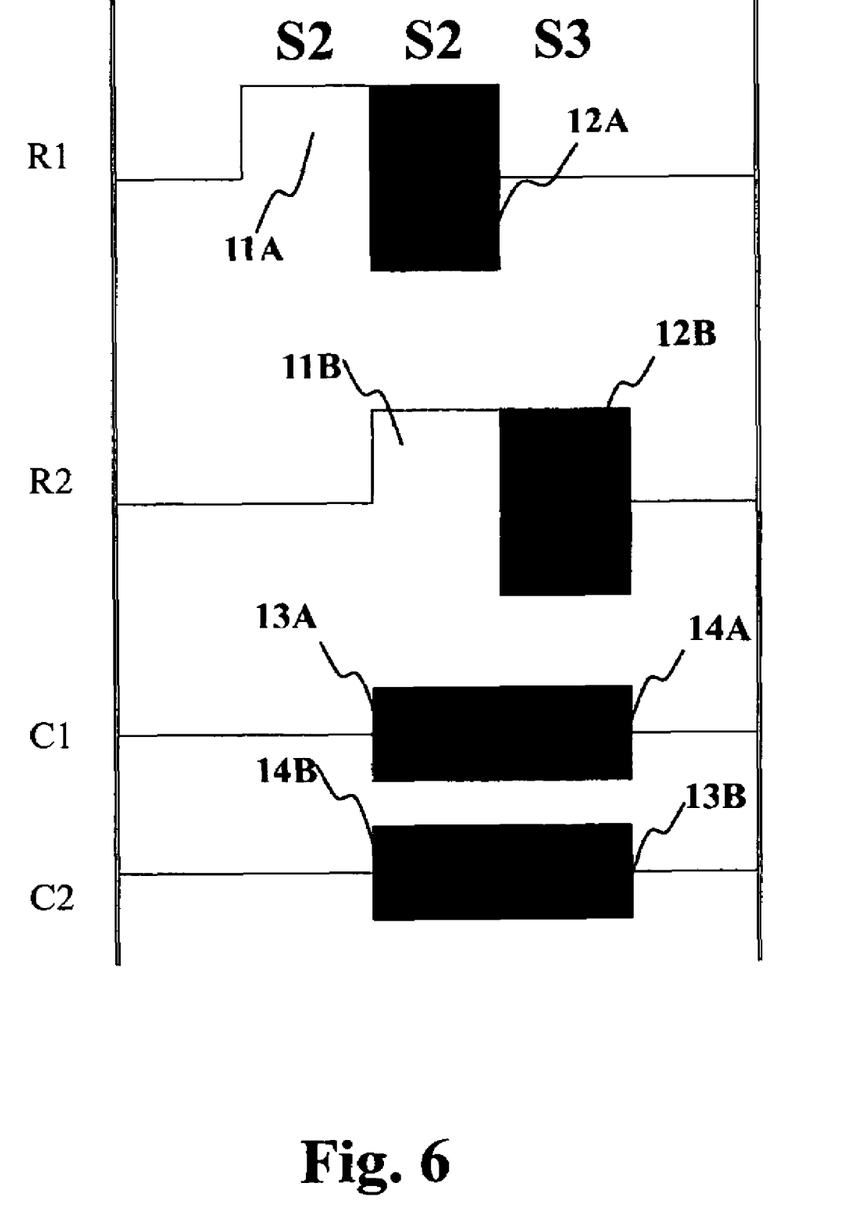
FIG. 6 shows the multiplex driving scheme in a liquid crystal display device of the present invention.

FIG. 6 shows an example of the multiplex driving pulse of this bistable twisted nematic display. In one embodiment of the present invention, the driving scheme involves first a high voltage pulse that can set the entire line to the homeotropic state. A selection pulse is then applied. If the selection pulse has a high frequency (which is defined as higher than $v_c$), then the pixel will be switched to the high twist state. If the selection pulse is low frequency (which is defined as lower than $v_c$) or null, then the dielectric force is along the direction perpendicular to the liquid crystal cell, and the low twist state will be favored.

Figure 7:
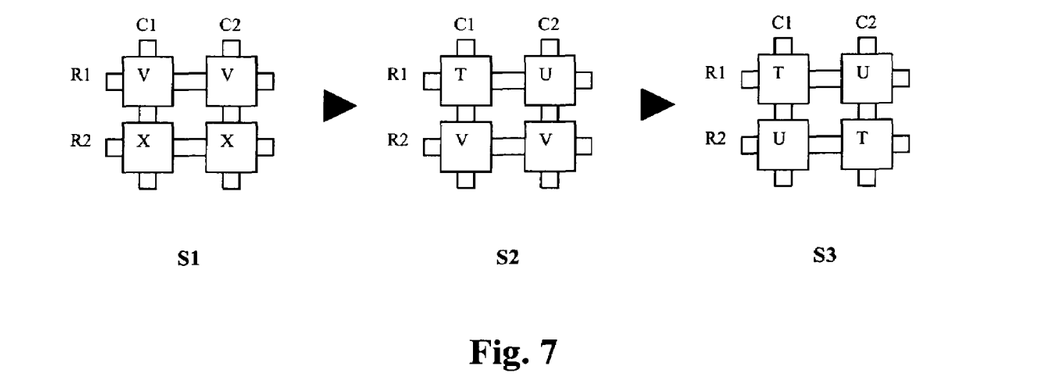
FIG. 7 shows the resultant pixels appearance after the driving scheme is applied.

In the example of the multiplex driving scheme, assuming that there is a display device with resolution of 2×2, it includes two rows R1 and R2 and two columns C1 and C2 and is provided with pixels named P1, P2, P3 and P4. Such device is going to drive and show a little crosshatch image. At the first scenario S1, R1, 11A is at reset phase; it applies a high voltage in order to set the entire row to homeotropic state V, X is unknown state. During the second scenario S2, R1 performs data write phase 12A. High frequency waveform is applied to R1, at the same time, the columns C1 are applied out of phase high frequency waveform 13A and C2 is connected to in phase high frequency waveform 14A. In such case (see FIG. 7), pixel P1 experiences high enough voltage to perform surface anchoring energy breaking and switch to high twist state. On the other hand, P2 has resultant pixel voltage lower than the threshold voltage of surface anchoring energy breaking. Therefore it remains at low twist state. In order to reduce the row scan time, a pipelining schedule is designed. While R1 is performing data writing phase, R2 is commanded to have reset phase at the same time 11B. At the scenario S3, R2 performs data write phase 12B. According to the driving waveform of the columns, C1 is in phase high frequency waveform 14B and C2 is out of phase high frequency waveform 13B. Therefore, the pixels P3 and P4 are driven from homeotropic state to low twist and high twist state respectively.

For the case where there are N rows, and the switching time $T_u$ of the low twisted state requires longer than the high twist state $T_h$. The critical time for the pipelining scheme is equal to switching time of the low twisted state. And the frame time will become $N*T_u$. However, it is known that the fastest frame time for the pipelining scheme is $N*T_h$. In order to achieve such goal, more rows should be involved in the reset phase once at a time. The exact number of rows, it may be called M, should have such relationship. In case 1, if the $T_u$ to $T_h$ is smaller than N, then fastest frame rate can be obtained by setting M is equal to the ratio of the switching time of low twist state and high twist state. However, in case 2, if the ratio of them is bigger than N, this implies that the whole screen should be reset before having the data write phase for each row.

Case 1:

If $\dfrac{T_u}{T_h} < N \rightarrow M = \dfrac{T_u}{T_h}$

Case 2:

If $\dfrac{T_u}{T_h} \geq N \rightarrow M = N$

It is intended that the specification and examples be considered as exemplary only, with a true scope and spirit of the invention being indicated by the following claims.

What is claimed is:

1. A bistable twisted nematic liquid crystal display, comprising:
   a first substrate having thereon a first conductive layer and a first alignment layer;
   a second substrate having thereon a second conductive layer and a second alignment layer;
   a liquid crystal layer in the first and second alignment layers;
   an alignment layer on each of the substrates, the alignment layer imparting a preferred direction for liquid crystal molecules near the alignment layer, and possessing different azimuthal and polar anchoring energies when used to align a liquid crystal layer;
   the alignment layers being rubbed in such a way to give a stable twist angle of the liquid crystal of $\phi$ where $\phi$ can be any value in between $-45°$ to $+45°$; and
   wherein the d/p ratio of the liquid crystal layer is between the values of $0.15+0.5\phi/\pi$ and $0.35+0.5\phi/\pi$.

2. A bistable twisted nematic liquid crystal according to claim 1, wherein the liquid crystal being a dual frequency liquid crystal with a crossover frequency $v_c$ that for driving frequencies below $v_c$, the dielectric anisotropy of the liquid crystal is positive; and for driving frequency above $v_c$, the dielectric anisotropy of the liquid crystal is negative.

3. A bistable nematic liquid crystal display according to claim 1, wherein the alignment layer is a mixture of polyimide and another polymer such as polyvinylpyrrolidone (PVP).

4. A bistable nematic liquid crystal according to claim 3, the mixture of polyimide and polymer is prepared from a solution mixture of polyimide and polyvinylpyrrolidone.

5. A bistable twisted nematic liquid crystal display according to claim 1 wherein the liquid crystal display is driven in a multiplex passive matrix with the pixel voltage including a reset phase and a selection phase, and wherein during the reset phase the liquid crystal is driven to homeotropic alignment and during the selection phase the liquid crystal is driven to either the $\phi$ or $\phi+\pi$ twist states.

* * * * *